I. BUNNELL.
Milk Pail.
No. 359.
Patented Aug. 18, 1837.
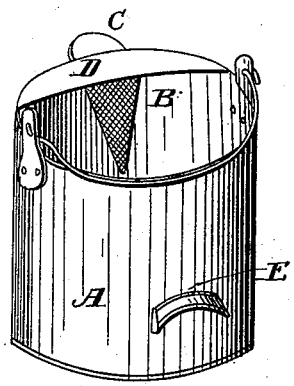
Witnesses:
S. M. P. Staples
Wm Baldwin
Inventor:
Isaah Bunnell

UNITED STATES PATENT OFFICE.

ISAIAH BUNNELL, OF DERBY, CONNECTICUT.

STRAINER FOR MILK-PAILS.

Specification of Letters Patent No. 359, dated August 18, 1837.

*To all whom it may concern:*

Be it known that I, ISAIAH BUNNELL, of Derby, in the county of New Haven and State of Connecticut, have invented a new and useful improvement in the construction of milk-pails by attaching to them a strainer of fine-wire cloth, through which the milk shall pass when poured from the pail.
To enable others skilled in the art, to make and use my invention, I describe its construction and operation as follows.

The body of the pail is of tin and in the usual form—and is improved thus, on one side I make an opening, extending from the top rim about half the depth of the pail, the width on the top about half the length of the depth and narrowing to an obtuse angle at the bottom, being for pails of ordinary size about five inches long from top to bottom and about two and one half inches wide on the top. This opening I cover on the inside of the pail with a strainer of fine wire cloth, of any suitable wire, soldered to its place.
The outside of the opening I cover by a swelling lip or spout of tin also soldered to its place. I also place a guard of tin over the top of the pail, adjoining the spout in form of a segment, covering about one eighth of the top, and on the outside of the pail, opposite the spout, and near the bottom, I place a lift-handle to facilitate the pouring from the pail.

This pail is used for milking, and the milk is perfectly strained, by simply pouring it, through the spout, into the receiving vessel. It may also be used, for all liquids, which require straining.

For further illustration, I refer to the drawings accompanying this specification.

What I claim as my invention and improvement, is—

The combination of the wire strainer with the milk pail and the necessary appendages, as above specified and therefor I solicit Letters Patent.

Dated this 5th March 1837.

ISAIAH BUNNELL.

Witnesses:
S. P. STAPLES,
J. BALDWIN.